United States Patent [19]

Casanova Valero

[11] 4,005,774
[45] Feb. 1, 1977

[54] PEDUNCLED VEGETABLE AND FRUIT POSITIONING DEVICE

[75] Inventor: Jose Maria Casanova Valero, Murcia, Spain

[73] Assignee: Compania Hispano Americana de Construcciones Conserveras S.A. Chaconsa, Murcia, Spain

[22] Filed: July 1, 1975

[21] Appl. No.: 592,319

Related U.S. Application Data

[63] Continuation of Ser. No. 427,853, Dec. 26, 1973, abandoned.

[52] U.S. Cl. ............................................... 198/384
[51] Int. Cl.² ......................................... B65G 47/24
[58] Field of Search .......... 198/257, 258, 263, 264, 198/266, 183

[56] References Cited
UNITED STATES PATENTS

| | | | |
|---|---|---|---|
| 1,595,829 | 8/1926 | Furbush | 198/183 |
| 2,713,934 | 7/1955 | Amori | 198/263 |
| 2,769,521 | 11/1956 | Hait | 198/258 |

Primary Examiner—Evon C. Blunk
Assistant Examiner—Joseph E. Valenza
Attorney, Agent, or Firm—Wenderoth, Lind & Ponack

[57] ABSTRACT

A peduncled vegetable and fruit positioning device has an endless conveyor train formed by pairs of rollers moving in the same direction, the rollers being axially parallelly arranged. One of the pairs of rollers has one or more peripheral canals and a radial blade while the other roller is hyperboloid or has a surface provided with one or various canals. The fruit coming from a feeder is deposited between each two rollers. A conveyor train has upper walls transverse to the displacement of the rollers, which walls separate each pair of rollers from the next, preventing the fruit from passing from one zone to the adjacent zone, so that the fruit deposited between two rollers turns due to contact therewith until the pedicle of the fruit is housed between the two rollers and extends in a vertical position between the rollers, so that the fruit finally rests on the outer surface of both rollers.

5 Claims, 2 Drawing Figures

PEDUNCLED VEGETABLE AND FRUIT POSITIONING DEVICE

This is a continuation of application Ser. No. 427,853, filed Dec. 26, 1973, now abandoned.

SUMMARY OF THE INVENTION

The present invention, relates to a peduncled vegetable and fruit positioning device.

The device generally consists in arranging the peduncled vegtables and fruit in the correct position so that a pedicle cutting machine can be fed.

BRIEF DESCRIPTION OF THE INVENTION

To supplement the description which will now be made, and with the purpose of providing a better understanding of the characteristics of the invention, the attached drawings are provided, wherein:

FIG. 1 is a side elevational view of the peduncled vegetable and fruit positioning device of the invention; and FIG. 2 is a plan view of a part of the device represented in FIG. 1.

DETAILED DESCRIPTION OF THE INVENTION

Figure 1:
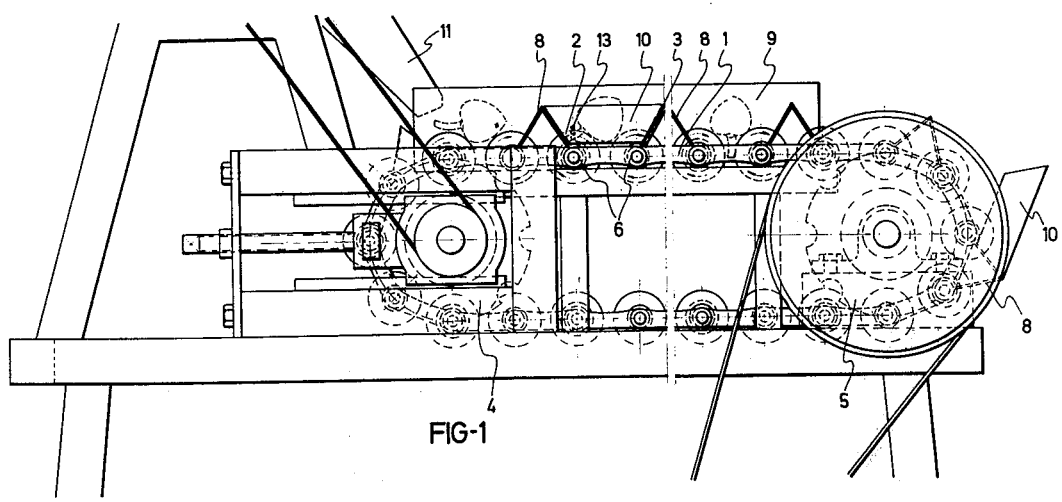

As can be seen from the drawings, the peduncled vegetable and fruit positioning device comprises an endless conveyor 1 formed by pairs of linked rollers 2 and 3 moved in the same direction by a drive device composed of two sprocket wheels 4 and 5.

The pairs of rollers are axially parallely arranged. The shaft of each roller 2 and 3 is solidly provided with an end pinion 6 meshed with a fixed rack 7 joined to the chassis of the device.

Each pairs of rollers 2 and 3 is separated by an upper wall 8 which is dihedrical in shape, the purpose of which is to prevent the peduncled fruit from passing from one pair of rollers to another adjacent pair.

Laterally, and in the working area, the conveyor train has a fixed plate 9, while the other side has trapezoidal plates 10 delimited by two dihedric walls 8. These trapezoidal plates 10 are solidly fastened at one of their sides to the prior corresponding dihedric wall 8, so that no damage will be caused thereto during turning of the sprocket wheels 4 and 5.

The purpose of fixed plate 9 and trapezoidal plates 10 is to prevent the peduncled fruit from falling sideways of its corresponding pair of rollers.

During displacement of the conveyor train 1, each pinion 6 meshes with the fixed rack 7, which meshing causes rollers 2 and 3 to turn in the same direction.

The peduncled fruit falling through hopper 11 is, thus, deposited between two pairs of rollers 2 and 3.

A fruit deposited between two rollers receives such a turning movement that the pedicle of the fruit is housed between the two rollers and oriented downwards, in which position it invariably remains, in spite of the continuous turning of the rollers and the displacement thereof.

The shape of the pairs of rollers 2 and 3 is varied and should be in harmony with the characteristics of the peduncled fruit to be positioned.

Figure 2:
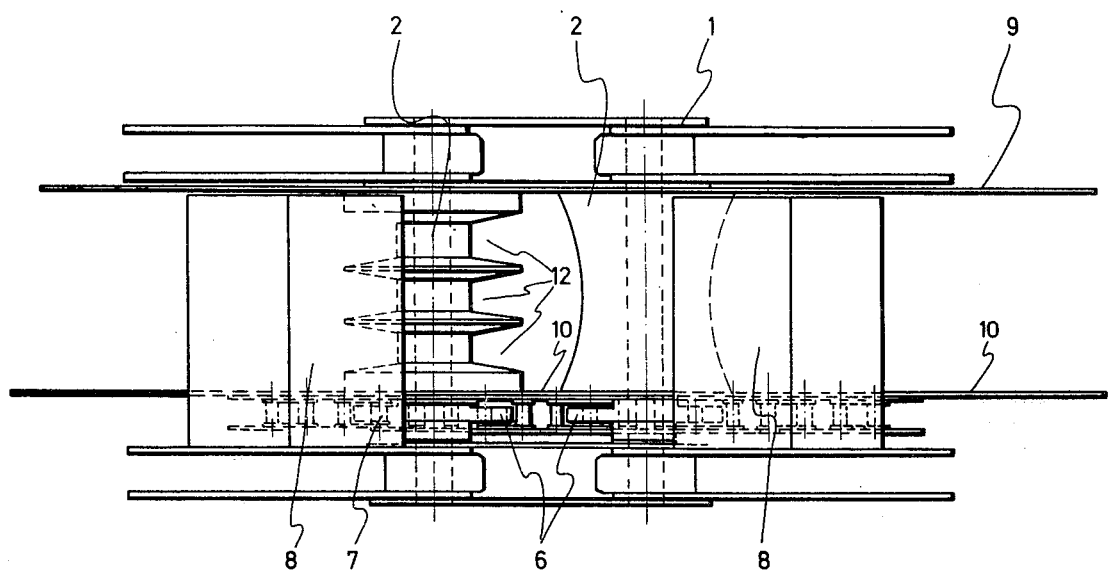

One of the preferred embodiments of this type of pairs of rollers is as illustrated in FIG. 2 and described below:

Roller 2 has peripheral canals 12 and a radial blade 13 projecting with respect to the edge of canals 12.

Roller 3 is hyperboloid and has a smooth surface.

In this way, blade 13 will help to position the fruit, so that its pedicle is oriented downwards and positioned in one of the canals 12 of roller 2.

I claim:

1. A device for positioning and transporting peduncled fruits and vegetables, said device comprising:
   a frame;
   an endless conveyor mounted for movement along said frame;
   said conveyor including a plurality of pairs of rollers arranged axially parallel to each other and transverse to the direction of movement of said conveyor;
   each said pair of rollers comprising a first type roller and a second type roller, at least one of said first and second type rollers having therein means for receiving and retaining the pedicle of a peduncled fruit or vegetable, said means comprising at least one peripheral canal;
   means operatively connected to said first and second type rollers for rotating said first and second type rollers in the same direction at the same speed, said rotating means comprising a rack fixedly mounted on said frame, and pinions fixed to said rollers and in meshing engagement with said rack;
   said conveyor having attached thereto and positioned between adjacent pairs of rollers generally upwardly extending dihedral walls;
   lateral plates positioned at opposite lateral sides of said conveyor and extending in said direction of movement thereof; and
   means extending radially from said at least one roller of each said pair of rollers for moving said peduncled fruit or vegetable such that said pedicle thereof is positioned in said at least one peripheral canal and such that said pedicle faces downwardly.

2. A device as claimed in claim 1, wherein said first type roller comprises said roller with said at least one peripheral canal therein; and said second type roller has a smooth hyperboloid surface.

3. A device as claimed in claim 2, wherein said positioning means comprises a blade extending radially from said at least one roller.

4. A device as claimed in claim 1, wherein the said lateral plate at one lateral side of said conveyor is fixedly attached to said frame.

5. A device as claimed in claim 4, wherein the lateral plates at a second lateral side of said conveyor comprise trapezium-shaped plates extending in the direction of movement of said conveyor, one each of said trapezium-shaped plates being connected to a respective of said dihedral walls.

* * * * *